(12) United States Patent
Hyun et al.

(10) Patent No.: US 11,515,761 B2
(45) Date of Patent: Nov. 29, 2022

(54) SBW DRIVING ACTUATOR

(71) Applicant: KYUNG CHANG INDUSTRIAL CO., LTD, Daegu (KR)

(72) Inventors: Ki Cheol Hyun, Daegu (KR); Kyu Jung Kim, Daegu (KR); Dae Yeon Kim, Daegu (KR); Jin Heo, Busan (KR); Tae Keuk Choi, Changwon-si (KR); Jeong Seok Kim, Changwon-si (KR)

(73) Assignees: KYUNG CHANG INDUSTRIAL CO., LTD, Daegu (KR); SAM HYUN CO., LTD., Changwon-si (KR)

( * ) Notice: Subject to any disclaimer, the term of this patent is extended or adjusted under 35 U.S.C. 154(b) by 123 days.

(21) Appl. No.: 16/887,228

(22) Filed: May 29, 2020

(65) Prior Publication Data

US 2021/0031828 A1 Feb. 4, 2021

(30) Foreign Application Priority Data

Jul. 31, 2019 (KR) .......................... 10-2019-0093552

(51) Int. Cl.
*H02K 11/215* (2016.01)
*H02K 11/21* (2016.01)
*F16H 61/32* (2006.01)
*H02K 7/116* (2006.01)
*H02K 29/08* (2006.01)
*B62D 5/00* (2006.01)
*B62D 15/02* (2006.01)

(52) U.S. Cl.
CPC ........... *H02K 11/215* (2016.01); *F16H 61/32* (2013.01); *H02K 7/116* (2013.01); *H02K 11/21* (2016.01); *H02K 29/08* (2013.01); *B62D 5/006* (2013.01); *B62D 15/021* (2013.01)

(58) Field of Classification Search
None
See application file for complete search history.

(56) References Cited

U.S. PATENT DOCUMENTS

| 6,169,349 B1 | 1/2001 | Davenport |
| 6,857,981 B2 | 2/2005 | Hori et al. |
| 7,326,143 B2 | 2/2008 | Kimura et al. |

(Continued)

FOREIGN PATENT DOCUMENTS

| DE | 102007009171 A1 * | 9/2007 | ........... B60N 2/0232 |
| JP | 2016008633 A   * | 1/2016 | |

(Continued)

OTHER PUBLICATIONS

Written Decision on Registration, Mar. 2021, Korean application KR 20190093552. (Year: 2021).*
Texas Instruments Reference Design (TIDUC69) (Year: 2016).*

*Primary Examiner* — Dirk Wright
(74) *Attorney, Agent, or Firm* — Lucas & Mercanti, LLP

(57) ABSTRACT

The present disclosure provides a shift by wire (SBW) driving actuator capable of improving control performance and durability through control of a brushless direct current (BLDC) motor by an inductive sensor, and improving gear transmission efficiency by introducing a multistage teeth-shaped transmission unit configured to connect a sun gear and an output shaft of a reducer to transmit a rotational force to reduce a load resulting from eccentric rotation of the sun gear.

5 Claims, 4 Drawing Sheets

(56) References Cited

U.S. PATENT DOCUMENTS

| | | |
|---|---|---|
| 7,377,242 B2 * | 5/2008 | Uehama .................. F01L 1/022 |
| | | 123/90.31 |
| 7,382,107 B2 | 6/2008 | Hori et al. |
| 7,446,499 B2 | 11/2008 | Kimura et al. |
| 7,946,957 B2 * | 5/2011 | Kimura .................... F16H 61/32 |
| | | 477/111 |
| 8,729,769 B2 * | 5/2014 | Takeuchi ............... H02K 15/00 |
| | | 310/43 |
| 9,321,172 B2 * | 4/2016 | Johnson ................. H02K 11/25 |
| 9,422,836 B2 * | 8/2016 | Takahashi ................. F01L 1/34 |
| 9,528,401 B2 * | 12/2016 | Otsubo ................... F16C 19/26 |
| 10,648,375 B2 * | 5/2020 | Brown ..................... F01L 1/352 |
| 2006/0276300 A1 | 12/2006 | Kashiwagi et al. |
| 2009/0058208 A1 | 3/2009 | Kimura et al. |
| 2009/0120222 A1 | 5/2009 | Kimura et al. |
| 2020/0332889 A1 * | 10/2020 | Makino ................ H02K 11/215 |
| 2020/0336037 A1 * | 10/2020 | Naitou ................... H02K 3/522 |
| 2020/0336043 A1 * | 10/2020 | Kume ................... H02K 7/083 |
| 2020/0340578 A1 * | 10/2020 | Shimada ................. F16H 61/32 |
| 2020/0340579 A1 * | 10/2020 | Shimada ............. F16H 63/3466 |

FOREIGN PATENT DOCUMENTS

| | | | | |
|---|---|---|---|---|
| KR | 20120000489 A | * | 1/2012 | |
| KR | 20170035227 A | * | 3/2017 | |
| KR | 20170118722 A | * | 10/2017 | ........... G01D 5/2053 |
| KR | 20180086544 A | * | 8/2018 | ............... H02K 7/08 |
| WO | WO-2007043514 A1 | * | 4/2007 | ........... B60K 17/043 |
| WO | WO-2013062376 A2 | * | 5/2013 | ............. B25J 9/1025 |
| WO | WO-2015000475 A2 | * | 1/2015 | ............. H02K 11/25 |
| WO | WO-2018064709 A1 | * | 4/2018 | ............ B25J 13/088 |

\* cited by examiner

SBW DRIVING ACTUATOR

CROSS-REFERENCE TO RELATED APPLICATION

This application claims priority to and the benefit of Korean Patent Application No. 10-2019-0093552, filed on Jul. 31, 2019, the disclosure of which is incorporated herein by reference in its entirety.

BACKGROUND

1. Field of the Invention

The present disclosure relates to a shift by wire (SBW) driving actuator capable of improving control performance and durability through control of a brushless direct current (BLDC) motor by an inductive sensor, and improving gear transmission efficiency by introducing a multistage teeth-shaped transmission unit configured to connect a sun gear and an output shaft of a reducer to transmit a rotational force to reduce a load resulting from eccentric rotation of the sun gear.

2. Discussion of Related Art

Generally, a driving actuator for electronic shift control is composed of a driving body composed of a stator and a rotor, and a reducer which transmits output by decelerating high speed rotation of the driving body to low speed rotation.

Specifically, in a conventional driving actuator, a Hall sensor and a multi-pole magnetized permanent magnet are used for control of a motor which is a driving body, and when an air gap is changed, the magnet and the Hall sensor are not only vulnerable to shock and heat due to generation of poor output thereof, but also cause problems such as a magnet demagnetization phenomenon due to heat effects and noise generation when foreign substances are attached to the magnet.

Further, in a reducer of the conventional driving actuator, there is a problem that an output shaft which transmits a rotational force from the sun gear generates a load on a bearing which supports an eccentric portion of a rotary shaft due to inclination of the sun gear which eccentrically rotates, and accordingly, there is a problem that transmission efficiency of the rotational force to the output shaft is reduced.

To this end, conventionally, a transmission unit which connects the sun gear and the output shaft by forming a protrusion on a disk portion of the sun gear and forming a protrusion hole, into which the protrusion of the sun gear is fitted, in the output shaft is provided.

However, in the case of the conventional transmission unit, since high precision manufacturability is required, there are big disadvantages that sophisticated manufacturing is necessary, and transmission efficiency varies according to precision.

(Patent Document 0001) Japanese Patent Application No. 5110449 (registered on Oct. 19, 2012)

SUMMARY OF THE INVENTION

The present disclosure is directed to improving control performance and durability through control of a brushless direct current (BLDC) motor by an inductive sensor, and improving gear transmission efficiency by introducing a multistage teeth-shaped transmission unit configured to connect a sun gear and an output shaft of a reducer to transmit a rotational force to reduce a load resulting from eccentric rotation of the sun gear.

The present disclosure is directed to solving problems such as a magnet demagnetization phenomenon due to overheating and noise generation when foreign substances are attached to the magnet as rotation control composed of a conventional Hall sensor and multi-pole magnetized permanent magnet is vulnerable to shock and heat due to poor output thereof by introducing an inductive sensor which does not use a magnet.

The present disclosure is directed to solving a problem that a power transmission unit using a conventional cycloid teeth and circular protruding groove requires high machining precision and manufacturability, and thus an efficiency difference is large according to the precision and manufacturability by introducing a multistage teeth-shaped transmission unit axially orthogonal to a sun gear and an output shaft of a reducer so that gear transmission efficiency is improved and manufacturing becomes easy.

According to an aspect of the present disclosure, there is provided a shift by wire (SBW) driving actuator including: a first housing; a stator including a bobbin and a coil wound around the bobbin, and disposed in the first housing; a rotor including a rotor core and a rotary shaft which is connected to the rotor core and provided with an eccentric portion at one end thereof, and disposed in the stator; an inductive sensor including metal targets (conductive couplers) connected to the other end of the rotary shaft, and a sensor plate disposed in the first housing, and having a transmitter and a receiver disposed at positions facing the metal targets (conductive couplers); a reducer including a sun gear connected to the eccentric portion of the rotary shaft to rotate eccentrically, a ring gear inscribed with the sun gear, an output shaft, and a multistage teeth-shaped transmission unit formed at the output shaft and the sun gear to transmit a rotational force to the output shaft; and a second housing in which the reducer is disposed.

The transmission unit according to the present disclosure may include external teeth inwardly forming a step on the basis of outer teeth of the sun gear, a flange part connected to the output shaft, and internal teeth formed in the flange part to be inscribed with the external teeth.

An inner side portion of the flange part according to the present disclosure may be further provided with a contact surface portion configured to come into contact with a disk portion of the sun gear.

The metal target (conductive coupler) of the inductive sensor may include a single metal plate or a plurality of metal plates.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
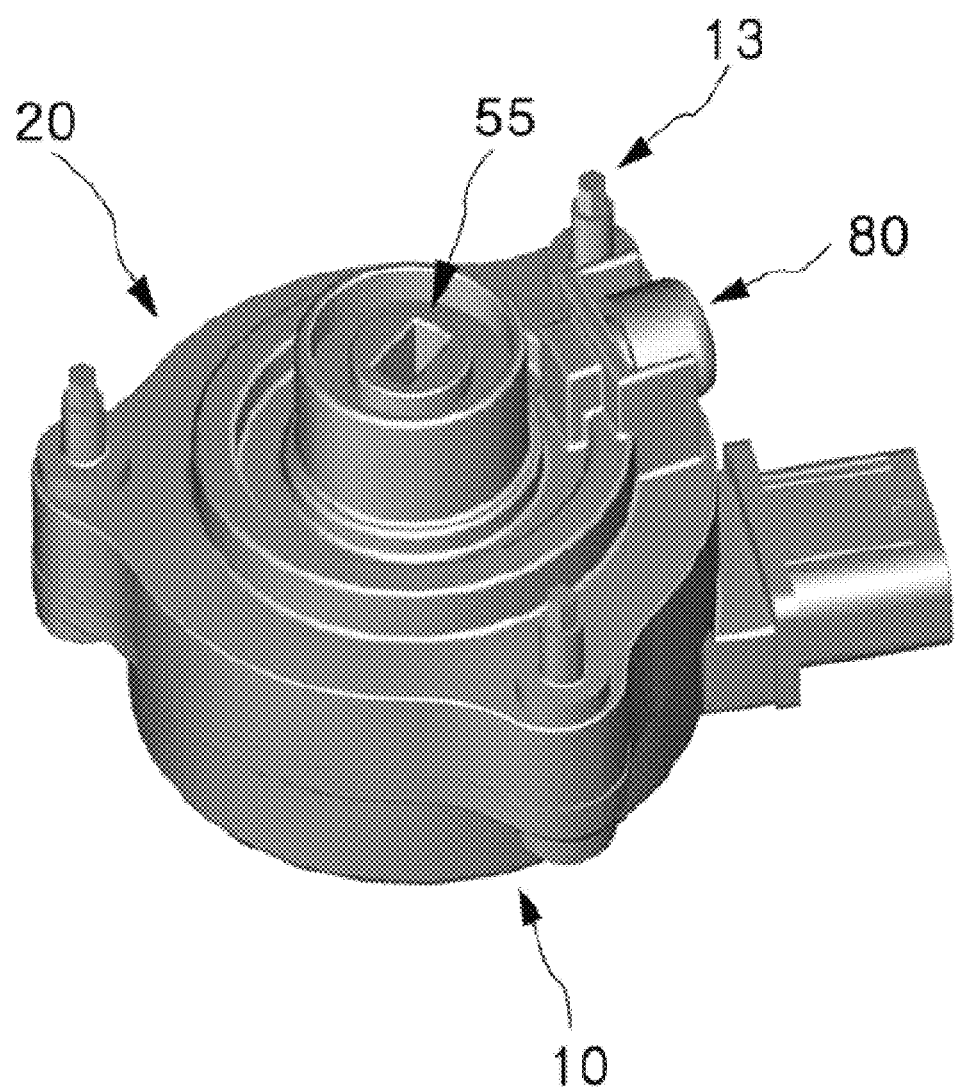
FIG. 1 is a perspective view illustrating a shift by wire (SBW) driving actuator according to the present disclosure.

In order to describe the present disclosure, operational advantages of the present disclosure, and purposes achieved by embodiments of the present disclosure, hereinafter, preferable embodiments of the present disclosure will be described and the present disclosure will be examined with reference to the preferable embodiments.

First, terms used in the present disclosure are used only to describe the particular embodiments and not to limit the present disclosure, and the singular form may be intended to also include the plural form, unless the context clearly indicates otherwise. Further, it should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

In a description of the present disclosure, when specific descriptions such as related known functions or configurations related to the present disclosure unnecessarily obscure the spirit of the present disclosure, a detailed description of the specific descriptions will be omitted.

As shown in FIGS. 1 to 4B, a shift by wire (SBW) driving actuator according to the present disclosure includes a first housing 10, a stator 20, a rotor 30, an inductive sensor 40, a reducer 50, and a second housing 60.

That is, the driving actuator according to the present disclosure includes a driving body composed of the stator 20 and the rotor 30, and the reducer 50 which transmits output by shifting high speed rotation of the driving body to low speed rotation.

In this case, the driving body is disposed in the first housing 10, and the reducer 50 is disposed in the second housing 60.

Figure 2:
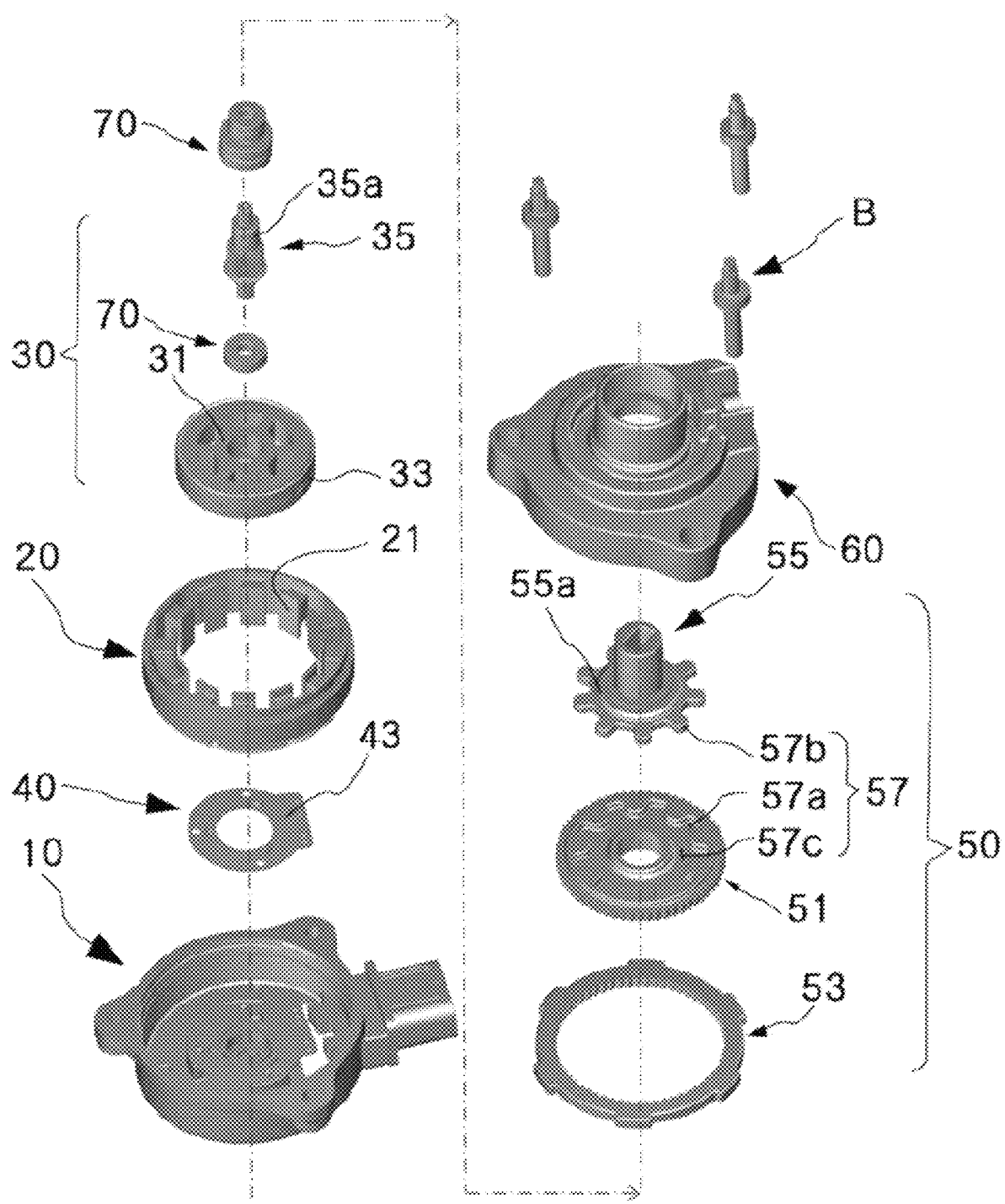
FIG. 2 is an exploded perspective view illustrating the SBW driving actuator according to the present disclosure.

First, as shown in FIGS. 1 and 2, an accommodation space in which the stator 20 and the rotor 30 are disposed is formed in the first housing 10 according to the present disclosure. Further, the inductive sensor 40 is disposed in the accommodation space, and to this end, a plurality of protrusions are formed on an inner side of the first housing 10, and a plurality of groove portions corresponding to the protrusions are formed in a sensor plate 43 of the inductive sensor 40 to be coupled to the protrusions.

The stator 20 according to the present disclosure includes a bobbin 21 and a coil 23 wound around the bobbin 21, and is disposed in the accommodation space of the first housing.

Further, the rotor 30 according to the present disclosure is composed of a rotor core 31, a magnet 33 which surrounds the rotor core 31, and a rotary shaft 35 connected to a center of the rotor core 31. An eccentric portion 35a of which an axis is eccentric may be formed at an end portion of the rotary shaft 35, that is, an end portion facing a disposing position of the first housing 10. The eccentric portion 35a is connected to a sun gear 51 of the reducer 50 to allow eccentric rotation of the sun gear 51. Conductive couplers 41 of the first inductive sensor 40 are connected to the other end of the rotary shaft 35, that is, an end portion facing a disposing position of the eccentric portion 35a.

Figure 3A:
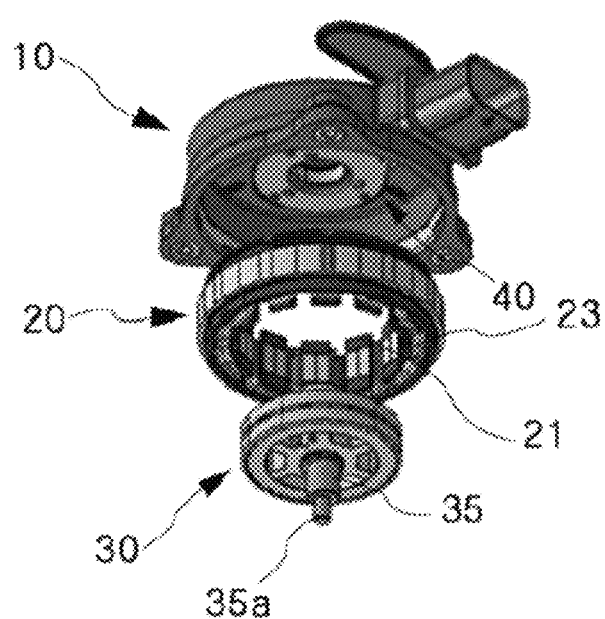
FIGS. 3A and 3B are perspective views illustrating an inductive sensor of the driving actuator according to the present disclosure.
Figure 3B:
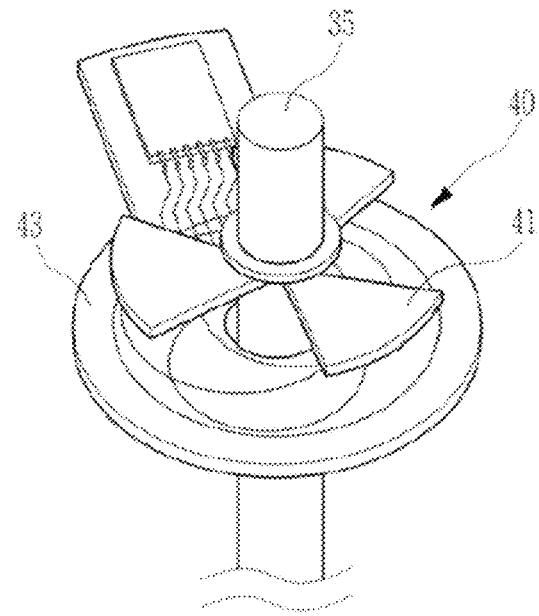

A plurality of bearings 70 are vertically disposed on the rotary shaft 35 of the rotor 30, and the bearings 70 are also disposed on the eccentric portion 35a of the rotary shaft 35 to support rotation of the rotary shaft 35. In this case, a through hole of the sun gear 51 is inserted onto the eccentric portion 35a of the rotary shaft 35, and in this case, in the bearings 70 disposed on the eccentric portion 35a, a large amount of load is generated in a process of transmitting a rotational force to the output shaft 55 by the eccentric rotation of the sun gear 51. A solution of the above problem will be described in more detail in connection with a transmission unit 57 of the reducer 50 which will be described later As shown in FIGS. 2, 3A, and 3B, the inductive sensor 40 according to the present disclosure is composed of metal targets (conductive couplers) 41 and the sensor plate 43. First, the sensor plate 43 is provided in the shape of a printed circuit board, and a coil-shaped transmitter (not shown) and a coil-shaped receiver (not shown) are disposed at positions facing the metal targets (conductive couplers) 41.

Further, each of the metal targets (conductive couplers) 41 of the inductive sensor 40 may be composed of a single metal plate or a plurality of metal plates, and in FIG. 3 appended herein, the metal targets (conductive couplers) 41 each having a shape in which the plurality of metal plates are disposed are shown. As described above, the metal targets (conductive couplers) 41 are connected to the other end of the rotary shaft 35 of the rotor 30.

Accordingly, when the rotary shaft 35 rotates, the metal targets (conductive couplers) 41 also rotate, and in this case, currents flow through the transmitter and thus a magnetic field is generated, and the receiver receives the magnetic field. An amount of the magnetic field received by the receiver is an amount of an electromotive force cross-changed according to whether a metal plate is present when the metal targets (conductive couplers) 41 rotate, an induced electromotive force (a voltage) induced from the receiver is changed, and sensing is performed by sensing a variation amount of the electromotive force.

The stator 20 and the rotor 30 according to the present disclosure are a brushless direct current (BLDC) motor-shaped driving body, and conventionally, control of the rotor 30 of the BLDC motor is composed of a Hall sensor and a multi-pole magnetized permanent magnet which control a rotation angle of the rotor 30. When an air gap is changed, the magnet and the Hall sensor have poor output and are vulnerable to shock and heat and thus a magnet demagnetization phenomenon due to overeating may be generated, and noise may be generated when foreign substances are attached to the magnet.

To prevent this, in the present disclosure, a position of the motor is controlled by introducing the inductive sensor 40 in an electromagnetic induction manner which does not use a magnet.

Figure 4A:
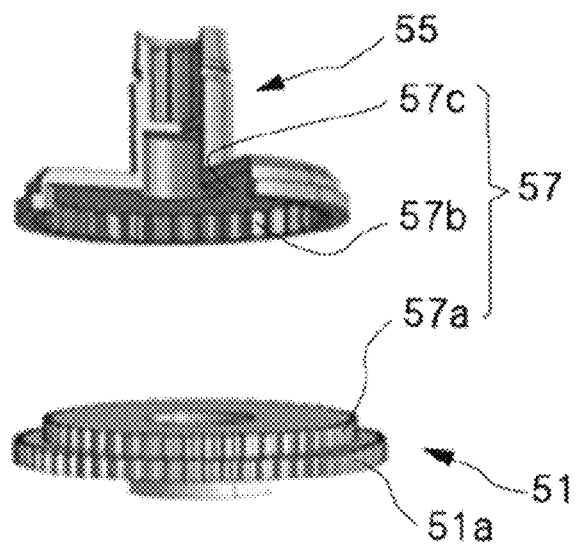
FIGS. 4A and 4B are perspective views illustrating a multistage teeth-shaped transmission unit of the driving actuator according to the present disclosure.
Figure 4B:
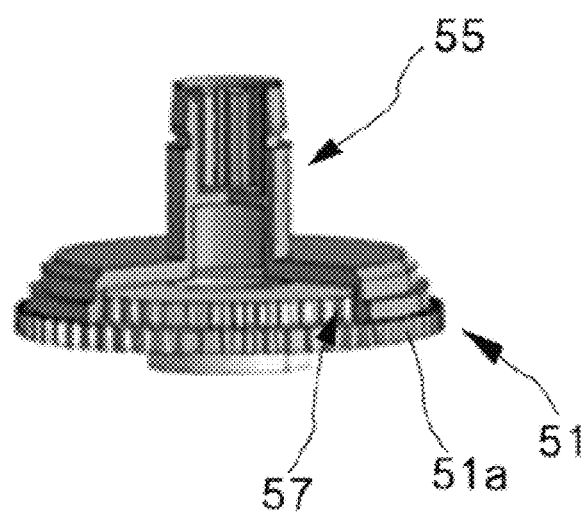

As shown in FIGS. 2, 4A, and 4B, the reducer 50 according to the present disclosure includes the sun gear 51, a ring gear 53, the output shaft 55, and a multistage teeth-shaped transmission unit 57.

First, outer teeth 51a are formed on an outer circumferential surface of the sun gear 51, and inner teeth corresponding to the outer teeth 51a are formed on an inner circumferential surface of the ring gear 53. Further, the through hole into which the eccentric portion 35a of the rotary shaft 35 is inserted is formed in a center of the sun gear 51, and the bearings 70 are disposed at the through hole of the sun gear 51 and the eccentric portion 35a of the rotary shaft 35 to support the rotary shaft 35.

Further, since the rotary shaft 35 is inserted into the output shaft 55, when the sun gear 51 eccentrically rotates, the rotational force may be transmitted.

That is, the sun gear 51 eccentrically rotates due to the rotation of the rotary shaft 35, and since the outer teeth 51a of the sun gear 51 rotate along the inner teeth of the ring gear 53, the sun gear 51 rotates idle in the ring gear 53. Accordingly, the rotational force is transmitted to the output shaft 55.

In this case, the transmission unit 57 is provided to transmit the rotational force from the sun gear 51 to the output shaft 55, and the transmission unit 57 is configured in a multistage teeth shape.

That is, a multistage teeth-shaped transmission unit 57 according to the present disclosure includes external teeth 57a inwardly forming a step on the basis of the outer teeth 51a of the sun gear 51, a flange part 55a orthogonally connected to the output shaft 55, and internal teeth 57b formed in the flange part 55a to be inscribed with the external teeth 57a.

Generally, in the transmission unit 57 which connects the sun gear 51 and the output shaft 55, since the sun gear 51 which eccentrically rotates is inclined, there is a problem that generates a load on the bearings 70 which support the eccentric portion 35a of the rotary shaft 35, and accordingly, transmission efficiency of the rotational force to the output shaft 55 is reduced.

Accordingly, to this end, the multistage teeth-shaped transmission unit 57 according to the present disclosure is provided, and a reason for the above will be described later.

First, since a force in a rotational direction decreases when the external teeth 57a of the sun gear 51 and the internal teeth 57b of the output shaft 55 become farther away from the axial centers of the bearings 70 which support the eccentric portion 35a of the rotary shaft 35, the multistage teeth-shaped transmission unit 57 may reduce the load applied to the bearings 70. Accordingly, a distance from the multistage teeth of the transmission unit 59 to the axial center of the bearing 70 may be at least 0.7 times a diameter of the sun gear 51.

Further, since the force of the tooth contact surface which acts on the output shaft 55 from the sun gear 51 matches in the normal direction and thus does not affect a radial force ingredient of the output shaft 55, reduction and loss of the weight applied to the bearings 70 which support the rotary shaft 35, more specifically, the eccentric portion 35a of the rotary shaft 35, do not occur and thus transmission efficiency may be improved.

In addition, since a sliding area between multistage teeth of the sun gear 51 and multistage teeth of the output shaft 55 which are engaged with each other is uniform and thus a bearing is uniform, the slipping is small and abrasion may be reduced and thus deformation of the teeth may also be reduced.

In this case, a contact surface portion 57c which comes into contact with the disk portion of the sun gear 51 is formed at an inner side portion of the flange part 55a of the output shaft, and when the contact surface portion 57c comes into contact with the disk portion to increase a contact area between the sun gear 51 and the output shaft 55 in the case in which the disk portion of the sun gear 51 and the flange part 55a of the output shaft are coupled to each other, the slipping may be reduced, and the abrasion may also be significantly reduced.

As shown in FIGS. 1 and 2, as described above, the reducer 50 is mounted in the second housing 60 according to the present disclosure, and an airbreather 80 is provided at an outer side portion of the second housing 60 to discharge bubbles or high pressure generated from the inside of the housing.

In this case, outer sides of the first housing 10 and the second housing 60 are provided with fastening portions corresponding to each other and thus are fastened and fixed by a bolt B, or a bolt and a nut.

A shift by wire (SBW) driving actuator according to the present disclosure can improve control performance and durability through control of a brushless direct current (BLDC) motor by an inductive sensor which does not use a magnet.

Further, the present disclosure can improve gear transmission efficiency and allow a transmission unit to be easily manufactured by introducing a multistage teeth-shaped transmission unit which connects a sun gear and an output shaft of a reducer to transmit a rotational force to reduce a load resulting from eccentric rotation of the sun gear.

As described above, the present disclosure is described with reference to one embodiment shown in the drawings but is only an example, and it may be understood that various modifications and other equivalents may be performed by those skilled in the art.

Accordingly, a technical scope of the present disclosure should be determined by a technical spirit of the appended claims.

What is claimed is:

1. A shift by wire (SBW) driving actuator comprising:
   a first housing (10);
   a stator (20) including a bobbin (21) and a coil (23) wound around the bobbin (21) and disposed in the first housing (10);
   a rotor (30) including a rotor core (31) and a rotary shaft (35) which is connected to the rotor core (31) and provided with an eccentric portion (35a) at one end thereof, and disposed in the stator (20);
   an inductive sensor (40) including metal targets (41) connected to the other end of the rotary shaft (35), and a sensor plate (43) disposed in the first housing (10) disposed at positions facing the metal targets (conductive couplers) (41);
   a reducer (50) including a sun gear (51) connected to the eccentric portion (35a) of the rotary shaft (35) to rotate eccentrically, a ring gear (53) inscribed with the sun gear (51), an output shaft (55), and a multistage teeth-shaped transmission unit (57) formed at the output shaft (55) and the sun gear (51) to transmit a rotational force to the output shaft (55); and
   a second housing (60) in which the reducer (50) is disposed,
   wherein the transmission unit (57) includes an external teeth (57a) inwardly forming a step on the basis of an outer teeth (51a) of the sun gear (51), a flange part (55a) connected to the output shaft (55), and an internal teeth (57b) formed in the flange part (55a) to be inscribed with the external teeth (57a).

2. The SBW driving actuator of claim 1, wherein an inner side portion of the flange part (55a) of the output shaft (55) is further provided with a contact surface portion (57c) configured to come into contact with an upper face of the sun gear (51).

3. The SBW driving actuator of claim 1, wherein the metal targets (41) of the inductive sensor includes a single metal plate or a plurality of the metal plates.

4. A shift by wire (SBW) driving actuator comprising:
   a first housing (10);

a stator (20) including a bobbin (21) and a coil (23) wound around the bobbin (21) and disposed in the first housing (10);
a rotor (30) including a rotor core (31) and a rotary shaft (35) which is connected to the rotor core (31) and provided with an eccentric portion (35a) at one end thereof, and disposed in the stator (20);
an inductive sensor (40) including metal targets (41) connected to the other end of the rotary shaft (35), and a sensor plate (43) disposed in the first housing (10) disposed at positions facing the metal targets (41);
a reducer (50) including a sun gear (51) connected to the eccentric portion (35a) of the rotary shaft (35) to rotate eccentrically, a ring gear (53) inscribed with the sun gear (51), an output shaft (55), and a multistage teeth-shaped transmission unit (57) formed at the output shaft (55) and the sun gear (51) to transmit a rotational force to the output shaft (55); and
a second housing (60) in which the reducer (50) is disposed,
wherein the metal targets (41) of the inductive sensor includes a single metal plate or a plurality of the metal plates, and
wherein the metal targets are conductive couplers.

5. A shift by wire (SBW) driving actuator comprising:
a first housing (10);
a stator (20) including a bobbin (21) and a coil (23) wound around the bobbin (21) and disposed in the first housing (10);
a rotor (30) including a rotor core (31) and a rotary shaft (35) which is connected to the rotor core (31) and provided with an eccentric portion (35a) at one end thereof, and disposed in the stator (20);
an inductive sensor (40) including metal targets (41) connected to the other end of the rotary shaft (35), and a sensor plate (43) disposed in the first housing (10) disposed at positions facing the metal targets (41);
a reducer (50) including a sun gear (51) connected to the eccentric portion (35a) of the rotary shaft (35) to rotate eccentrically, a ring gear (53), and an output shaft (55); and
a second housing (60) in which the reducer (50) is disposed,
wherein the sun gear (51) includes a first part and a second part protruding from the first part to the output shaft (55),
wherein a diameter of the first part is greater than a diameter of the second part,
wherein an outer teeth (51a) are formed on an outer circumferential surface of the first part,
wherein an external teeth (57a) are formed on an outer circumferential surface of the second part,
wherein a through hole is formed in a center of the sun gear (51),
wherein the through hole penetrates both the first part and the second part,
wherein the ring gear (53) inscribes with the outer teeth (51a) of the sun gear (51),
wherein a flange part (55a) connected to the output shaft (55) includes an internal teeth (57b) to be inscribed with the external teeth (57a) of the sun gear (51).

* * * * *